(12) United States Patent
Chen

(10) Patent No.: US 8,558,804 B2
(45) Date of Patent: Oct. 15, 2013

(54) TOUCH CONTROL APPARATUS AND TOUCH POINT DETECTION METHOD

(75) Inventor: Yung-Wei Chen, Taipei (TW)

(73) Assignee: Silicon Motion, Inc., Jhubei, Hsinchu County (TW)

( * ) Notice: Subject to any disclaimer, the term of this patent is extended or adjusted under 35 U.S.C. 154(b) by 974 days.

(21) Appl. No.: 12/637,159

(22) Filed: Dec. 14, 2009

(65) Prior Publication Data

US 2011/0141030 A1 Jun. 16, 2011

(51) Int. Cl.
*G06F 3/041* (2006.01)

(52) U.S. Cl.
USPC ............................... 345/173; 345/175; 345/8

(58) Field of Classification Search
USPC ....................... 345/173, 175, 156, 8
See application file for complete search history.

(56) References Cited

U.S. PATENT DOCUMENTS

| | | | |
|---|---|---|---|
| 2006/0284839 A1* | 12/2006 | Breed et al. | 345/156 |
| 2007/0075919 A1* | 4/2007 | Breed | 345/8 |
| 2008/0300055 A1* | 12/2008 | Lutnick et al. | 463/39 |
| 2010/0097353 A1* | 4/2010 | Newton | 345/175 |
| 2010/0295821 A1* | 11/2010 | Chang et al. | 345/175 |

FOREIGN PATENT DOCUMENTS

CN 101582001 11/2009

OTHER PUBLICATIONS

Chinese language office action dated Apr. 27, 2012.
English language translation of abstract of CN 101582001 (published Nov. 18, 2009).

* cited by examiner

*Primary Examiner* — Thuy Pardo
(74) *Attorney, Agent, or Firm* — McClure, Qualey & Rodack, LLP

(57) ABSTRACT

A touch control apparatus, having a touch pad receiving contact from at least one object is provided. Four edges form a rectangle that encircles the touch pad. All the edges are surfaced with geometric textures. A first camera is deposited on a corner of the first edge and the fourth edge of the rectangle, having a field of view sufficient to collect a first image including the second edge and third edge of the rectangle. A second camera is deposited on a corner of the second edge and the fourth edge of the rectangle, having a field of view sufficient to collect a second image including the first edge and third edge of the rectangle. A calculation unit performs a characteristic extraction process on the geometric textures of the first and second images to determine whether an object has touched the touch pad, and if so, coordinates thereof are determined.

15 Claims, 6 Drawing Sheets

TOUCH CONTROL APPARATUS AND TOUCH POINT DETECTION METHOD

BACKGROUND OF THE INVENTION

1. Field of the Invention

The invention relates to touch point detection, and in particular, to a method and apparatus for touch point detection employing image analysis technology.

2. Description of the Related Art

Touch control technology is a technology that provides intuitive and easy human interface for various devices, such as mobile devices, displays and hand writing boards. Users may directly touch a touch pad with his/her finger or a stylus, and coordinates of the touch point would be detected by different methods, such as a capacitance circuit array overlaid on the touch pad. An image sensing technique may also be employed to determine coordinates of the touch point. For example, infrared light emitting diode (LED) arrays may be deposited on one horizontal edge and one vertical edge of a rectangle, while two rows of infrared sensors are deposited on the opposite horizontal edge and vertical edges of the rectangle. Thus, an infrared grid is formed on the touch pad. Any touch point on a particular position of the touch pad would cause at least a pair of a horizontal sensor and a vertical sensor to be obstructed from their corresponding infrared light sources, such that the coordinates of the position can be determined.

For the conventional touch detection techniques, however, the cost of LEDs and sensor arrays is high. Thus, for large panel displays, use of the technology is not feasible. Thus, a more flexible structure is desirable.

BRIEF SUMMARY OF THE INVENTION

An embodiment of a touch control apparatus is provided. A touch pad receives contact from at least one object. A first edge, a second edge, a third edge and fourth edge form a rectangle that encircles the touch pad. The first edge is opposite to the second edge, the third edge is opposite to the fourth edge, and all the edges are surfaced with geometric textures. A first camera is deposited on a corner of the first edge and the fourth edge of the rectangle, having a field of view sufficient to collect a first image including the second edge and third edge of the rectangle. A second camera is deposited on a corner of the second edge and the fourth edge of the rectangle, having a field of view sufficient to collect a second image including the first edge and third edge of the touch pad. A calculation unit performs a characteristic extraction process on the geometric textures of the first and second images to determine whether an object has touched the touch pad, and if so, coordinates thereof are determined.

An embodiment of a touch point detection method implemented on the aforementioned apparatus is also provided. A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
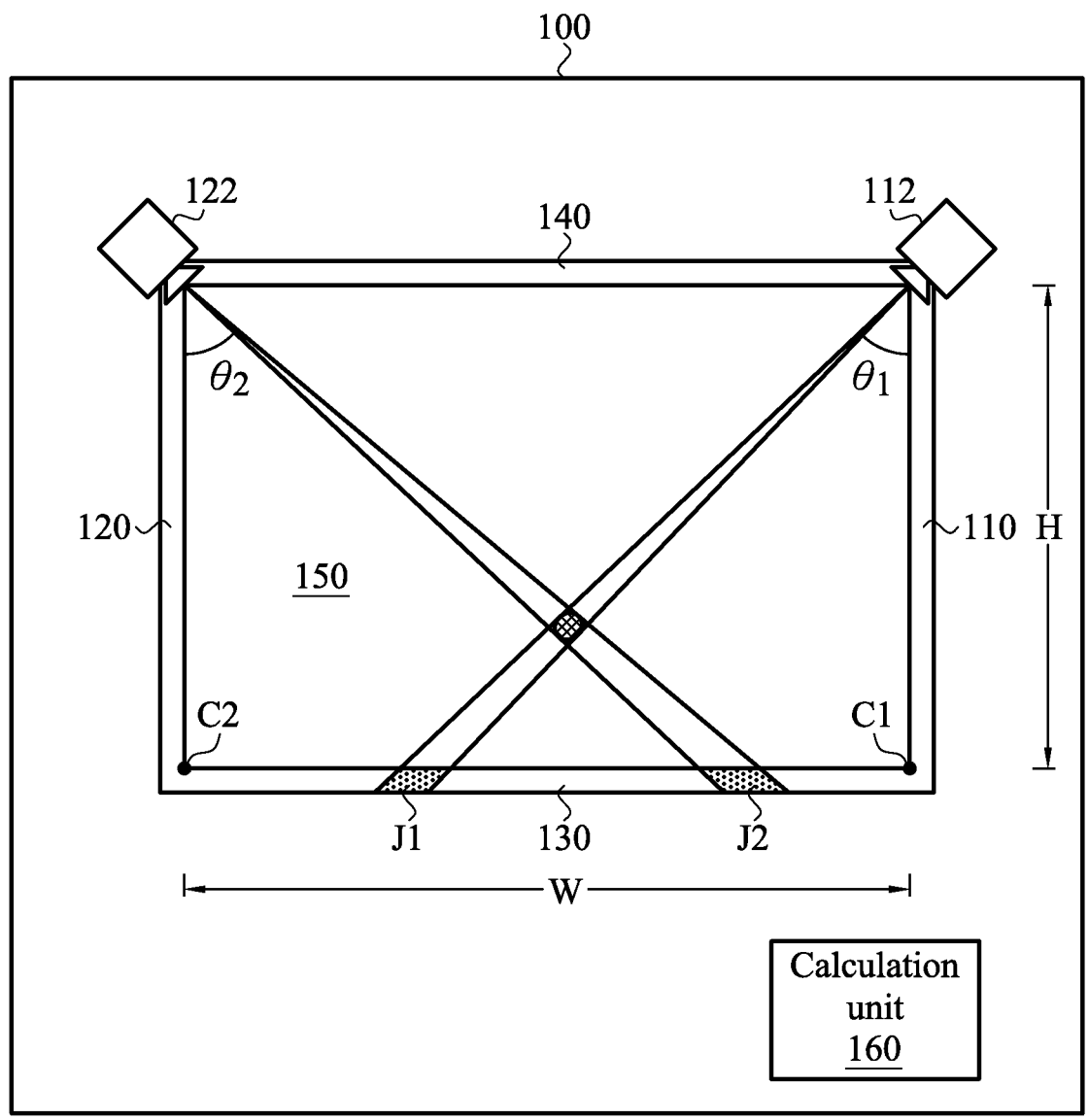
FIG. 1a shows an embodiment of a touch control apparatus according to the invention.

In the embodiment of the invention, image detection technology is employed to locate coordinates of touch points P1 on the touch control apparatus 100. FIG. 1a shows an embodiment of a touch control apparatus according to the invention 100. The touch control apparatus 100 may represent a conceptual structure of any touch control device, such as a mobile device, a personal digital assistance, a touch control display panel, or other touch control machines. In the touch control apparatus 100, a touch pad 150 is typically a rectangle with certain width W and height H, serving as an interface for touching. The touch pad 150 may also comprise a display that presents a user interface with interactive visual effects in response to the contact. The touch pad 150 is surrounded by four edges. A first edge 110, a second edge 120, a third edge 130 and fourth edge 140 form a rectangle that encircles the touch pad 150. In the embodiment, touch detection is implemented by image detection of the edges. Specifically, any contact would be captured as images to determine coordinates of a touch point. The edges are surfaced with particularly designed geometric textures. The geometric textures are embedded with hidden information supporting image detection, such that any object obstructing the edges can be easily detected. A first camera 112 is deposited on a cross corner of the first edge 110 and the fourth edge 140, having a field of view (FOV) of at least 90 degrees. The first camera 112 can capture an image including views of the second edge 120 and third edge 130, whereby the geometric textures on the second edge 120 and third edge 130 are monitored and analyzed. Likewise, a second camera 122 is deposited on a cross corner of the second edge 120 and the fourth edge 140, collecting an image including the first edge 110 and third edge 130 for further analysis. A calculation unit 160 receives the images captured by the first camera 112 and second camera 122, and performs a characteristic extraction process to determine whether an object has touched the touch pad 150, and if so, coordinates thereof are determined. Details of the extraction process would be further described below.

Figure 1B:
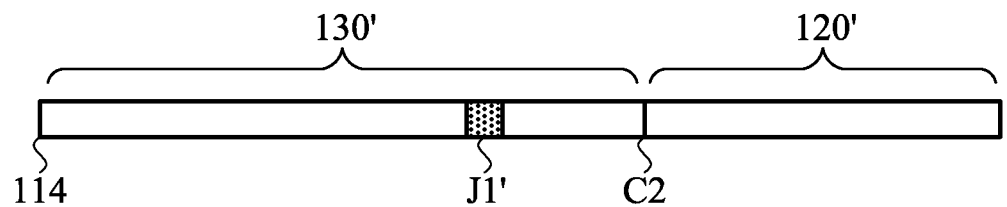
FIGS. 1b and 1c show images captured by cameras.
Figure 1C:
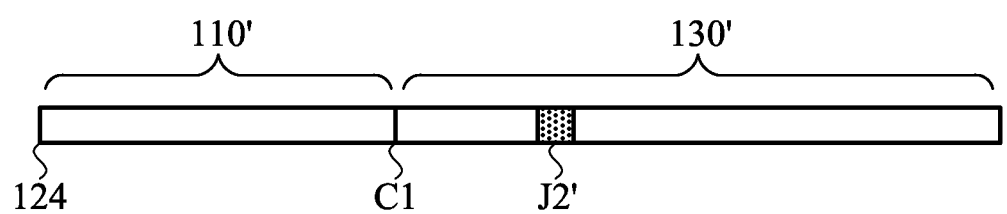

FIGS. 1b and 1c show images captured by the first camera 112 and second camera 122, respectively. In FIG. 1b, the first image 114 is a line image captured by the first camera 112, including views of the second edge 120 and third edge 130, denoted as segments 120' and 130' separated by a corner point C2 where the second edge 120 and third edge 130 are intersected. Meanwhile, FIG. 1c shows a second image 124 captured by the second camera 122, including views of the first edge 110 and third edge 130, denoted as segments 110' and 130' separated by a corner point C1 where the first edge 110 and third edge 130 are intersected. Since the touch pad 150 is a flat plane, and a contact on the touch pad 150 is generally regarded as an obstruction contacting or very close to its surface, the first image 114 and second image 124 can be line images of one dimension dedicated to present obstruction statuses near the surface of the touch pad 150. Referring to FIG. 1a, when an object touches the touch pad 150 on a touch point P1, geometric textures on locations J1 and J2 are obstructed from the first camera 112 and second camera 122, respectively. Thereby, as shown in FIG. 1b, an obstructed point J1' appear on a corresponding location of the segment 130'. Likewise, in FIG. 1c, an obstructed point J2' appears on the segment 130'. As described, the first edge 110, second edge 120 and third edge 130 are surfaced with particularly designed geometric textures. Consequently, if no obstruction exists, the first image 114 and second image 124 may fully present the geometric textures. The locations of the obstructed points J1' and J2' are linearly related to the locations J1 and J2, thus the locations J1 and J2 can be determined by geometric calculations. The detail of locating the obstructed points J1' and J2' will be described below. Thus, the calculation unit 160 then reads the first image 114 and second image 124 captured by the first camera 112 and second camera 122 to perform a characteristic extraction process on the geometric textures of the first and second images to identify obstruction locations on the first and second images, respectively.

Once the locations J1 and J2 are identified, view angles of the touch point P1 from perspectives of the first camera 112 and second camera 122 can be further determined. For example, in FIGS. 1a and 1b, the calculation unit 160 determines a first angle $\Theta_1$ indicating a direction from the first camera 112 to the touch point P1 based on the obstructed point J1' on the first image 114. Referring to FIGS. 1a and 1c, the calculation unit 160 determines a second angle $\Theta_2$ indicating a direction from the second camera 122 to the touch point P1 based on the obstructed point J2' on the second image 124. As shown in FIG. 1a, the first camera 112, the point J1 and the corner point C1 form a first right-angled triangle, the second camera 122, the point J2 and the corner point C2 form a second right-angled triangle, and the touch point P1 is at a cross point of the first and second right-angled triangles. By calculating the first angle $\Theta_1$ and second angle $\Theta_2$, coordinates of the P1 can be determined by a trigonometric calculation based on the first angle $\Theta_1$, the second angle $\Theta_2$, and the width W and height H of the touch pad 150. For brevity of description, the coordinates of P1 is denoted as:

$P1(x,y)=f(\Theta_1,\Theta_2)$.

Note that detailed geometric determinations based on trigonometric functions are omitted herein.

In addition, a look up table can be utilized to assist the determination of the coordinates of P1. Since the width W and height H of the touch pad 150 are fixed, the locations of the obstructed points (e.g. J1' and J2') and the coordinates of corresponding touching point (e.g. P1) will have a fixed relationship. The look up table can be built according to the relationship. Thus, the calculation unit 160 can determine the coordinates of the touching point according to the look up table and the locations of the obstructed points. Hence, the geometry calculation processes described above can be omitted, and the operation speed can be greatly improved.

As described, when an object contacts the touch pad 150, the first image 114 and second image 124 captured by the first camera 112 and second camera 122 would contain an obstruction among the background geometric textures. The geometric textures of the edges are particularly designed in order to efficiently discriminate obstructions from the background edges in the captured images. A characteristic extraction process may be adapted to identify the obstructions in the geometric textures.

Figure 2A:
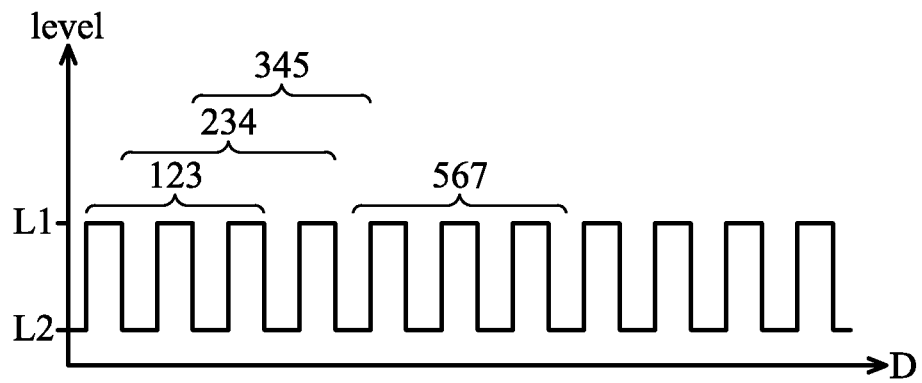
FIG. 2a shows an embodiment of geometric textures of striped patterns according to the invention.

For example, FIG. 2a shows an embodiment of geometric textures, in which the first edge 110, second edge 120, third edge 130 and fourth edge 140 are surfaced with striped patterns. Please note that, in another embodiment, the fourth edge 140 which will not be monitored by the first camera 112 and second camera 122 is unnecessary to be surfaced with striped patterns or special geometric textures. In FIG. 2a, the vertical axis represents a brightness level, and the horizontal axis represents location D along the first or second image. The high contrast stripe patterns, specifically, comprising high level (L1) stripes and low level (L2) stripes, are alternatively arranged along the image. In practice, the high level L1 stripes are referred to by the white color, and the low level L2 stripes are referred to by the black color. The characteristic extraction in the embodiment may be an edge detection process, whereby the rising edges and falling edges in the high contrast stripes can be counted. For example, edge sums are counted per segment. The first three high contrast edges labeled as 123, comprise a total of 6 edges. Likewise, the next three stripes 234, 345 and so on, are incrementally counted in the same way. Relationships of the edge sum corresponding to positions along the edge can be plotted, such as shown in FIG. 2b.

Figure 2B:
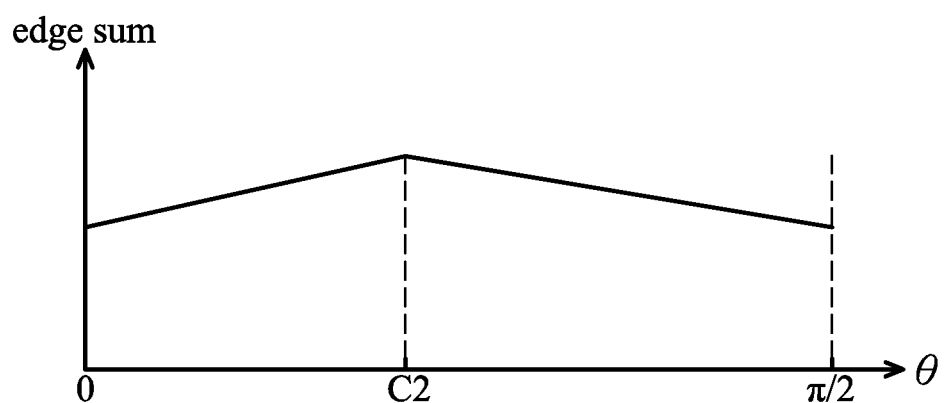
FIG. 2b is a diagram of edge sum wherein no touch point is presented.

FIG. 2b shows a relationship between the edge sums and view angle $\Theta$ from the perspective of the first camera 112. The view angle $\Theta$ ranges from 0 to 90 ($\pi/2$) degrees, indicating field of view from the first camera 112 that includes the entire ranges of the second edge 120 and the third edge 130. The relationship between view angle $\Theta$ and the edge position is typically based on the trigonometric function in view of the width W and height H, thus detailed derivation of the relationship can be easily determined and is not explained herein. Edge sums can be counted for each increment angle. In FIG. 2b, it is shown that the edge sum is gradually increased from 0 degrees to the corner point C2, and then decreased until reaching 90 degrees. That is, because the corner point C2 is the furthest point from the first camera 112, and as the distance gets farther, the projected images of stripe patterns get smaller and appear denser, thus the edge sum is slightly increased per angle.

Figure 2C:
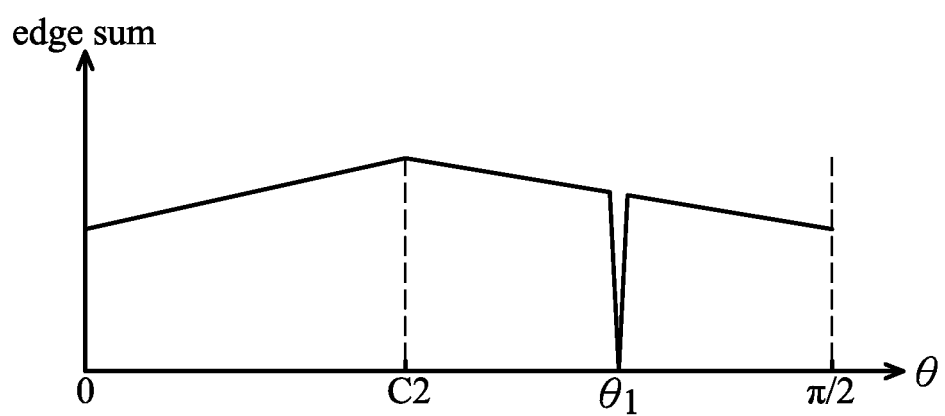
FIG. 2c is a diagram of edge sum wherein a touch point is presented.

FIG. 2c shows a drop down in magnitude detected on the angle $\Theta_1$ when an object touches the touch pad 150 at the touch point P1. The touch point may be a finger or a stylus, which may prevent the stripe patterns of a corresponding location from forming the first image 114. Thus, through edge detection and edge sum calculation, the number of edges around the obstructed location is quickly determined. Thereby, the angle $\Theta_1$ is assessed.

Meanwhile, from the perspective of the second camera 122, the edge detection is performed on the second image 124, thus the angle $\Theta_2$ is obtained in the same way as that in the first image 114.

Figure 3A:
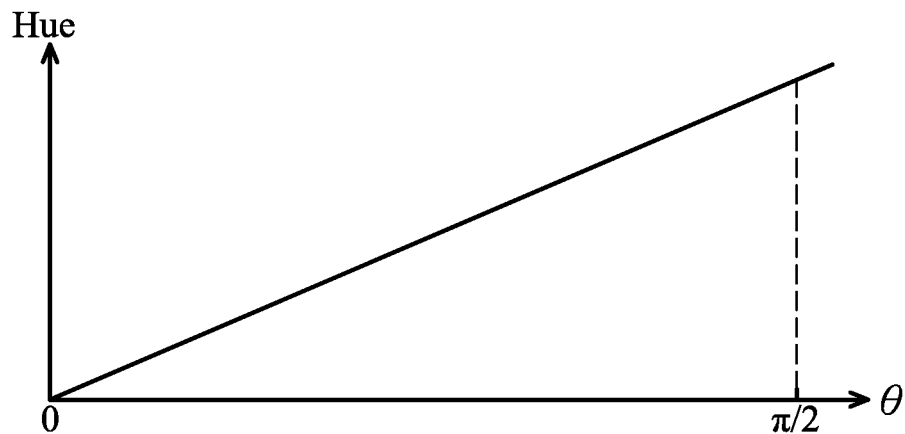
FIG. 3a shows an embodiment of geometric textures of incremental hue values.
Figure 3B:
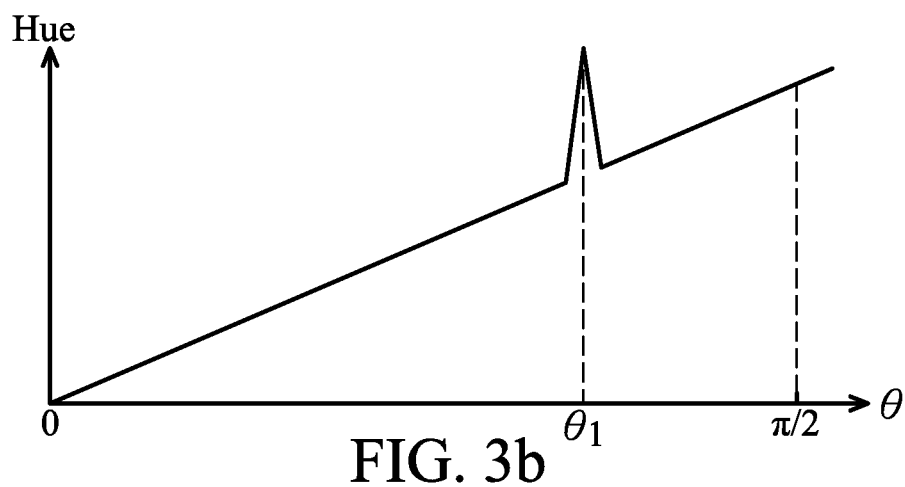
FIG. 3b shows an embodiment of geometric textures of incremental hue values affected by an object according to the invention.
Figure 3C:
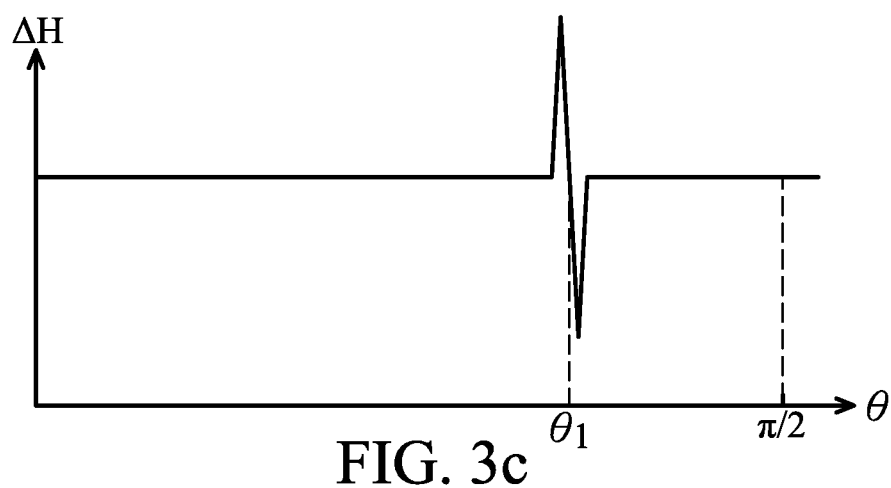
FIG. 3c is a diagram of hue value variation over view angles.

FIGS. 3a to 3c show further embodiments of the geometric textures according to the invention. In the embodiment, the geometric textures are incremental hue values in the Hue Saturation Lightness (HSL) color space. A hue value is typically presented by the phase value ranging from 0 to 360 degrees. Through arrangement, the first image 114 in FIG. 1b can be made to have a linear relationship between hue values and pixel positions. Consequently, as shown in FIG. 3a, when the hue values in the first image 114 are plotted versus the view angle Θ, the relationships between hue values and view angle Θ are also linear. The view angle Θ ranges from 0 to 90 degrees, and the hue value is arranged to linearly increase in proportional to the view angle Θ.

When an object touches the touch pad 150, hue variation will be detected on the first image 114 because the color of the touch point (the color of the finger or the stylus) would destroy the regulation of the hue distribution. As shown in FIG. 3b, a hue disturbance occurs on view angle $Θ_1$ when an object contacts the touch pad 150. FIG. 3c is a diagram of hue value variation over view angles converted from FIG. 3b. As the hue value is incrementally increased, the hue value variation stays constant in FIG. 3c, until a rapid spike is shown, occurring on the view angle $Θ_1$ due to the touch point color (the color of the finger or the stylus) variation. Since the variation of the hue value on the view angle $Θ_1$ is in an unpredictable rate beyond an expected average value, the view angle $Θ_1$ is assessed to be obstructed.

In the embodiment, the geometric textures are particularly arranged to facilitate image detection, providing sensitive detection ability to any obstruction (or any severe change) on the image through the characteristic extraction process, particularly in a spatial domain (especially in one-dimensional spatial domain). However, there may be other geometric texture arrangements which are applicable, and the invention is not limited thereto.

Figure 4:
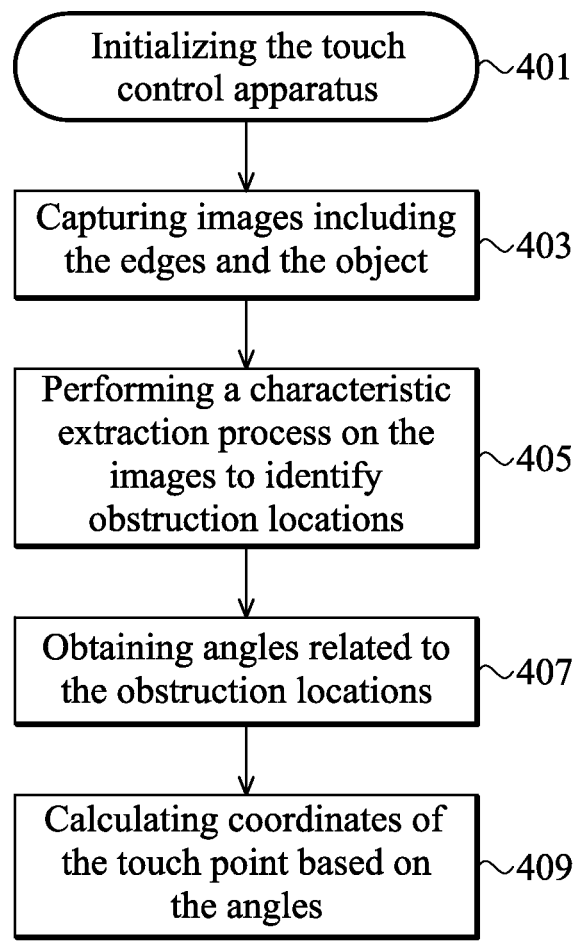
FIG. 4 is a flowchart of touch point detection according to an embodiment of the invention.

FIG. 4 is a flowchart of touch point detection according to an embodiment of the invention. The process can be summarized into the following steps. In step 401, a touch control apparatus featuring image detection as described in FIG. 1 is initialized. The edges of the touch pad 150 are intentionally surfaced with particular designed geometric textures. In step 403, the first camera 112 and first image 114 capture images of the edges. If any object touches the touch pad 150, a part of the images would be obstructed, and characteristics of the geometric textures would be changed. In step 405, a characteristic extraction process is performed on the images captured from the first camera 112 and first image 114 to locate the obstruction on the images. In step 407, view angels $Θ_1$ and $Θ_2$ are obtained based on the obstructed location on the images, indicating directions from the first camera 112 and first image 114 to the touch point, respectively. In step 409, coordinates of the touch point is deduced by trigonometric functions based on the view angles $Θ_1$ and $Θ_2$, and the width W and height H of the touch pad 150.

Figure 5:
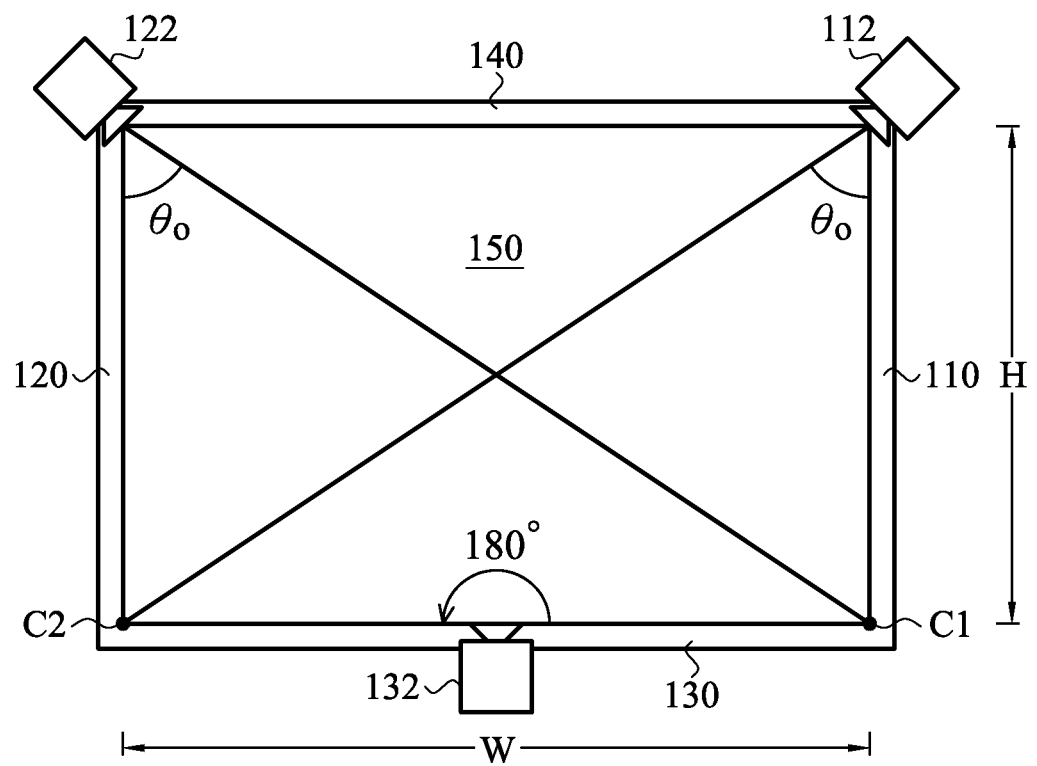
FIG. 5 shows a further embodiment of a touch pad according to the invention.

FIG. 5 shows a further embodiment of a touch pad according to the invention 150. The number of cameras in the embodiment is not limited. For example, a third camera 132 may further be implemented on the third edge 130, having a FOV of 180 degrees, monitoring any obstructions on the first edge 110, second edge 120 and fourth edge 140 to support determining touch points cooperatively with the first camera 112 and second camera 122. Multi-touch detection may also be used in the embodiment if more than two cameras are employed on different corners or edges of the touch pad 150, and the invention it is not limited thereto.

As described, the angles viewed from the first camera 112 and second camera 122 are linear to obstruction locations on the corresponding edges, and the linear relationship can be pre-calculated be lookup tables of the trigonometric functions, or by a calibration process. For example, in a calibration process, the touch pad 150 receives contact to each corners of the touch pad 150, such as corner points C1 and C2. For the first camera 112, the angle $Θ_0$ related to corner point C2 is a known value based on a tangent function of the width W and the height H of the touch pad 150. When an object touches the corner point C2, the first camera 112 captures an image with the touch point, such that the relationship of the angle $Θ_0$ with the corner point C2 is linked. Other boundary conditions can be obtained similarly. For example, the direction from the first camera 112 to the corner point C1 is associated to 0 degrees, and the direction from the first camera 112 to the second camera 122 is 90 degrees. Since the boundary conditions are all available, a linear interpolation can be performed to derive relationships between other angle values with non-corner locations of the captured images.

Alternatively, specific patterns may be arranged on the endpoints of the edges, such as the corner points C1 and C2, allowing the characteristic extraction process to identify the endpoints. Since angles related to the endpoints are known values, the relationships between edge locations and angles can be automatically determined by interporlation.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A touch control apparatus, comprising:
   a touch pad, receiving contact from at least one object;
   a first edge, a second edge, a third edge and fourth edge forming a rectangle that encircles the touch pad, wherein the first edge is opposite to the second edge, the third edge is opposite to the fourth edge, and the first edge, the second edge, and the third edge are surfaced with geometric textures;
   a first camera, deposited on a corner of the first edge and the fourth edge of the rectangle, having a field of view sufficient to collect a first image including the second edge and third edge;
   a second camera, deposited on a corner of the second edge and the fourth edge of the rectangle, having a field of view sufficient to collect a second image including the first edge and third edge; and
   a calculation unit, coupled to the first camera and second camera, performing a characteristic extraction process on the geometric textures of the first and second images to determine whether an object has touched the touch pad, and if so, coordinates thereof are determined, wherein when an object touches the touch pad on a touch point:
   the first camera captures images of the second edge, third edge and the touch point to form the first image;
   the second camera captures images of the second edge, third edge and the touch point to form the second image; and
   the first and second images are one dimensional line images.

2. The touch control apparatus as claimed in claim 1, wherein:
   the object on the touch point is an obstruction preventing geometric textures on relative locations to be presented on the first and second images; and
   the calculation unit performs the characteristic extraction process on the geometric textures of the first and second images to identify obstruction locations on the first and second images respectively.

3. The touch control apparatus as claimed in claim 2, wherein:
   the geometric textures comprise periodic high contrast stripe patterns;
   when performing the characteristic extraction process, the first and second images are processed as a plurality of incremental segments, and the calculation unit detects edge sum variations between each incremental segment; and
   if an edge sum of a particular segment is varied by a rate beyond an expected average value, its corresponding location is assessed as being obstructed.

4. The touch control apparatus as claimed in claim 2, wherein:
   the geometric textures comprise predetermined hue values in the Hue Saturation Lightness (HSL) color space;
   when performing the characteristic extraction process, the first and second images are processed as a plurality of incremental segments, and the calculation unit detects hue value variations between each adjacent incremental segment; and
   if a hue value of a particular segment is varied by a rate beyond an expected average value, its corresponding location is assessed as being obstructed.

5. The touch control apparatus as claimed in claim 2, wherein:
   the calculation unit determines a first angle indicating a direction from the first camera to the touch point based on a first obstructed point on the first image, and a second angle indicating a direction from the second camera to the touch point based on a second obstructed point on the second image; and
   the calculation unit performs a geometric calculation based on the first angle, the second angle, and the width and height of the touch pad to determine the coordinates of the touch point.

6. The touch control apparatus as claimed in claim 5, wherein the first and second angles are calculated by the calculation unit substituting the first and second obstruction locations into a linear function to determine the first and second angles.

7. The touch control apparatus as claimed in claim 6, wherein:
   the linear function is obtained by the calculation unit performing a calibration process on the touch pad;
   when performing the calibration process, the touch pad receives contact on each corners of the touch pad, wherein angles of the corners are predetermined known values based on the width and height of the touch pad;
   the calculation unit detects the obstruction locations on the first and second images related to the corners to establish relationships between the known angles and the obstructed locations; and
   the calculation unit performs linear interpolation to derive other angle values related to non-corner locations on the first and second images.

8. The touch control apparatus as claimed in claim 2, wherein the calculation unit determines the coordinates according to a look up table and the obstruction locations.

9. A touch point detection method, comprising:
   providing a touch pad for receiving contact from at least one object;
   encircling the touch pad with a first edge, a second edge, a third edge and fourth edge, wherein the first edge is opposite to the second edge, the third edge is opposite to the fourth edge, and the first edge, the second edge, and the third edge are surfaced with geometric textures;
   capturing a first image including the touch point, the second edge and third edge from a first corner between the first edge and the fourth edge;
   capturing a second image including the touch point, the first edge and the third edge from a second corner between the second edge and fourth edge; and
   performing a characteristic extraction process on the geometric textures of the first and second images to determine coordinates of a touch point where the touch pad is contacted and identify obstruction locations on the first and second images respectively; wherein the first and second images are one dimensional line images, and the object on the touch point is an obstruction that prevents geometric textures on relative locations to be presented on the first and second images.

10. The touch point detection method as claimed in claim 9, wherein:
    the geometric textures comprise periodic high contrast stripe patterns; and
    the characteristic extraction process comprises:
    processing the first and second images as a plurality of incremental segments;
    detecting edge sum variations between each incremental segment; and
    if an edge sum of a particular segment is varied by a rate beyond an expected average value, assessing its corresponding location as being obstructed.

11. The touch point detection method as claimed in claim 9, wherein:
    the geometric textures comprise predetermined hue values in the Hue Saturation Lightness (HSL) color space; and
    the characteristic extraction process comprises:
    processing the first and second images as a plurality of incremental segments;
    detecting hue value variations between each adjacent incremental segment; and
    if a hue value of a particular segment is varied by a rate beyond an expected average value, assessing its corresponding location as being obstructed.

12. The touch point detection method as claimed in claim 9, further comprising:
    determining a first angle indicating a direction from the first corner to the touch point based on an obstructed location on the first image;
    determining a second angle indicating a direction from the second corner to the touch point based on an obstructed location on the second image; and
    performing a geometric calculation based on the first angle, the second angle, and the width and height of the touch pad to determine the coordinates of the touch point.

13. The touch point detection method as claimed in claim 12, wherein calculation of the first and second angles comprises substituting the obstructed locations into a linear function to determine the first and second angles.

14. The touch point detection method as claimed in claim 13, further comprising performing a calibration process on the touch pad to obtain the linear function, comprising:
    receiving contact on each corners of the touch pad, wherein angles of the corners are predetermined known values based on the width and height of the touch pad;
    detecting the obstructed locations on the first and second images related to the corners to establish relationships between the known angles and the obstructed locations; and
    performing linear interpolation to derive other angle values related to non-corner locations on the first and second images.

15. The touch point detection method as claimed in claim 9, wherein the coordinates is determined according to a look up table and the obstruction locations.

* * * * *